United States Patent
Ishizaki et al.

(10) Patent No.: US 11,112,304 B2
(45) Date of Patent: Sep. 7, 2021

(54) SPECTROMETER CALIBRATION

(71) Applicant: Heptagon Micro Optics Pte. Ltd., Singapore (SG)

(72) Inventors: Kotaro Ishizaki, Singapore (SG); Javier Miguel-Sánchez, Singapore (SG); Peter Roentgen, Singapore (SG)

(73) Assignee: Heptagon Micro Optics Pte. Ltd., Singapore (SG)

( * ) Notice: Subject to any disclaimer, the term of this patent is extended or adjusted under 35 U.S.C. 154(b) by 0 days.

(21) Appl. No.: 16/610,238

(22) PCT Filed: May 3, 2018

(86) PCT No.: PCT/SG2018/050217
§ 371 (c)(1),
(2) Date: Nov. 1, 2019

(87) PCT Pub. No.: WO2018/203831
PCT Pub. Date: Nov. 8, 2018

(65) Prior Publication Data
US 2020/0056939 A1    Feb. 20, 2020

Related U.S. Application Data

(60) Provisional application No. 62/500,601, filed on May 3, 2017.

(51) Int. Cl.
*G01J 3/42* (2006.01)
*G01J 3/02* (2006.01)
*G01N 21/27* (2006.01)

(52) U.S. Cl.
CPC .............. *G01J 3/0297* (2013.01); *G01J 3/42* (2013.01); *G01N 21/274* (2013.01)

(58) Field of Classification Search
CPC .. G01J 3/0297; G01J 3/42; G01J 3/28; G01N 21/274
See application file for complete search history.

(56) References Cited

U.S. PATENT DOCUMENTS

2003/0147070 A1* 8/2003 Sezginer ............ G01N 21/9501
356/237.2
2006/0017922 A1 1/2006 Lewis et al.
(Continued)

FOREIGN PATENT DOCUMENTS

CN 102636263 A 8/2012
WO 2017/069708 A1 4/2017

OTHER PUBLICATIONS

Vacheret et al. "Characterization and Simulation of the Response of Multi Pixel Photon Counters to Low Light Levels", Nucl. Instr. and Meth. In Phys. Res. A, Jan. 12, 2011, p. 1-15 (Year: 2011).*
(Continued)

*Primary Examiner* — David P Porta
*Assistant Examiner* — Mamadou Faye
(74) *Attorney, Agent, or Firm* — Michael Best and Friedrich LLP

(57) ABSTRACT

Calibrating a spectrometer module includes performing measurements using the spectrometer module to generate wavelength-versus-operating parameter calibration data for the spectrometer module, performing measurements using the spectrometer module to generate optical crosstalk and dark noise calibration data for the spectrometer module, and performing measurements using the spectrometer module to generate full system response calibration data, against a known reflectivity standard, for the spectrometer module. The method further includes storing in memory, coupled to the spectrometer module, a calibration record that incorporates the wavelength-versus-operating parameter calibration data, the optical crosstalk and dark noise calibration data,
(Continued)

and the full system response calibration data, and applying the calibration record to measurements by the spectrometer module.

17 Claims, 5 Drawing Sheets

(56) References Cited

U.S. PATENT DOCUMENTS

| | | |
|---|---|---|
| 2007/0181793 A1 | 8/2007 | Harrison |
| 2010/0276578 A1* | 11/2010 | Shelley .............. G01N 21/3563 250/252.1 |
| 2010/0292581 A1 | 11/2010 | Howard et al. |
| 2011/0035189 A1 | 2/2011 | Fujii |
| 2014/0176946 A1 | 6/2014 | Matsumoto et al. |
| 2014/0253921 A1* | 9/2014 | Chen .................... G01J 3/0297 356/416 |

OTHER PUBLICATIONS

International Search Report issued for corresponding International Application No. PCT/GB2018/050090 dated Mar. 1, 2019.
International Preliminary Report on Patentability for Related Application No. PCT/SG2018/050217 dated Nov. 5, 2019 (6 pages).
Extended Search Report issued from the European Patent Office for related Application No. 18794903.7 dated Dec. 14, 2020 (8 Pages).

\* cited by examiner

SPECTROMETER CALIBRATION

CROSS-REFERENCE TO RELATED APPLICATION(S)

This application is a National Stage Entry of Application No.: PCT/SG2018/050217 filed May 3, 2018, which claims benefit of priority of U.S. Provisional Patent Application No. 62/500,601, filed on May 3, 2017. The entire contents of the earlier application are incorporated herein by reference.

FIELD OF THE DISCLOSURE

The present disclosure relates to spectrometer calibration.

SUMMARY

An optical spectrometer is an instrument used to measure properties of light over a specific portion of the electromagnetic spectrum. Spectrometers can be used, for example, to identify materials. The variable measured sometimes is the light's intensity, with the independent variable being the wavelength of the light. Some spectrometers measure spectral regions in or near the visible part of the electromagnetic spectrum, although some spectrometers also may be able to measure other wavelengths, such as the infra-red (IR) or ultraviolet (UV) parts of the spectrum.

In reflectance spectrometers, the spectrometer measures the fraction of light reflected from a surface as a function of wavelength. Reflectance measurements can be used to determine, for example, the color of a sample, or examine differences between objects for sorting or quality control.

In some instances, spectrometers are manufactured as small, compact modules that contain the required optoelectronic components (e.g., light source and optical sensor) in a housing under a cover glass. Light produced by the light source is emitted from the module toward a sample under test. Light reflected by the sample under test is detected by the sensor.

Manufacturing processes for the spectrometer modules sometimes result in variations in fabrication, tolerances, and variability of the multiple components of the system. Such variations can result in unintended variations from one module to the next.

The present disclosure describes spectrometer calibration.

In one aspect, for example, the disclosure describes a method of calibrating a spectrometer module. The method includes performing measurements using the spectrometer module to generate wavelength-versus-operating parameter calibration data for the spectrometer module, performing measurements using the spectrometer module to generate optical crosstalk and dark noise calibration data for the spectrometer module, and performing measurements using the spectrometer module to generate full system response calibration data, against a known reflectivity standard, for the spectrometer module. The method further includes storing in memory, coupled to the spectrometer module, a calibration record that incorporates the wavelength-versus-operating parameter calibration data, the optical crosstalk and dark noise calibration data, and the full system response calibration data.

A specific example described in greater detail below uses the operation voltage of a MEMS tunable filter as the operating parameter for wavelength calibration. However, other implementations use a different operating parameter for the wavelength calibration. For example, the operating parameter, in some instances, can be a different physical control mechanism.

Some implementations include one or more of the following features. For example, the method also can include applying the calibration record to measurements by the spectrometer module. In some instances, the calibration record is applied to measurements of a sample by the spectrometer module to obtain one or more calibrated wavelength-dependent reflectivity values ($R_{MUT}(\lambda)$). In some implementations, the one or more calibrated wavelength-dependent reflectivity values ($R_{MUT}(\lambda)$) are calculated in accordance with:

$$R_{MUT}(\lambda) = R_{reference}(\lambda) \cdot \frac{S_{reference\ measured}(\lambda) - S_{infinite\ measured}(\lambda)/S_{MUT\ measured}(\lambda)}{S_{infinite\ measured}(\lambda)},$$

where $R_{reference\ measured}(\lambda)$ is a wavelength-dependent reflectivity of a known reference material, $S_{infinite\ measured}(\lambda)$ is a calibrated wavelength-dependent intensity value indicative of optical crosstalk intensity and dark noise, $S_{reference\ measured}(\lambda)$ is a calibrated wavelength-dependent system response intensity value, and $S_{MUT\ measured}(\lambda)$ is an intensity value measured by the spectrometer module in response to a sample being tested.

In another aspect, the disclosure describes a non-transitory storage medium storing computer instructions operable to cause one or more computers to perform operations including applying a calibration record to measurements of a sample by a spectrometer module to obtain one or more calibrated wavelength-dependent reflectivity values ($R_{MUT}(\lambda)$). The one or more calibrated wavelength-dependent reflectivity values ($R_{MUT}(\lambda)$) are calculated based on: a wavelength-dependent reflectivity of a known reference material, a calibrated wavelength-dependent intensity value indicative of optical crosstalk intensity and dark noise, a calibrated wavelength-dependent intensity value for a system response of the spectrometer module, and an intensity value measured by the spectrometer module in response to a sample being tested.

In some cases, the calibration techniques can help ensure that each spectrometer module operates as intended and so as to reduce the variations from one spectrometer module to the next.

Other aspects, features and advantages will be readily apparent from the following detailed description, the accompanying drawings, and the claims.

DETAILED DESCRIPTION

Figure 1:
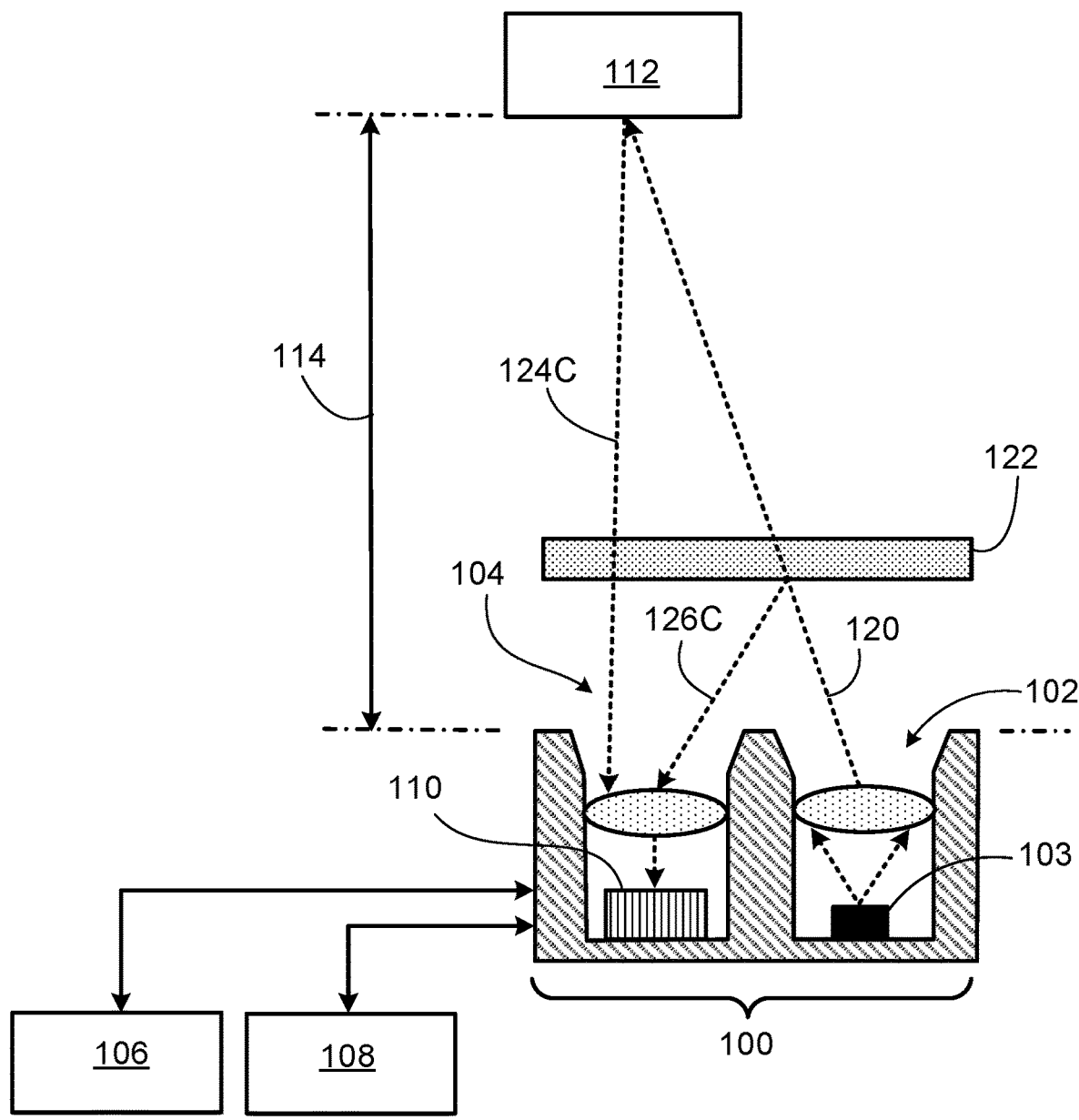
FIG. 1 illustrates an example of a spectrometer module.

A shown in FIG. 1, a spectrometer module 100 includes a transmission channel 102 and a collection channel 104. The transmission channel 102 is operable to generate light at multiple wavelengths (or narrow wavelength bands) within a broader range of bandwidths.

The transmission channel 102 can include a tunable narrowband light source 103, which can be implemented, for example, as a tunable laser, a lamp combined with a monochromator, or a lamp combined with a tunable optical filter. In some implementations, the light source includes a lamp and a tunable Fabry-Perot interferometer (FPI), which in some instances is based on silicon micro electro-mechanical systems (MEMs) technology. MEMS based-FPIs typically include a vertically integrated structure composed of two mirrors separated by an air gap. Wavelength tuning is achieved by applying a voltage between the two mirrors, which results in an electrostatic force which pulls the mirrors closer to one another. As a particular example, the filter can be scanned over a specified wavelength range such as 1350 nm-1650 nm. Other wavelength ranges may be appropriate for other implementations. In some implementations, a single broadband light source (e.g., a lamp) is disposed in the transmission channel 102, and the MEMS-based FPI is disposed in the collection channel 104.

Light 120 transmitted from the transmission channel 102 is directed to a sample 112 through a transparent solid window 122 such as a cover glass positioned between the optoelectronic module 100 and the sample 112. In the illustrated example, the sample 112 is located at a distance 114 from the module. Depending on the properties of the sample 112, various wavelengths of light impinging on the sample 112 may be reflected by different amounts. Some of the light 124C reflected from the sample 112 can be received in the collection channel 104. Optical cross talk 126C (e.g., light reflected from the cover glass 122) may be received in the collection channel 104 as well. In some instances, light transmitted through the walls of the module or through other channels also may be received by the detector and contribute to the optical cross-talk. The collection channel 104 includes an optical sensor 110, such as a photodiode, which is operable to detect light reflected by the sample 112 as well as the light reflected by the cover glass 122. As mentioned above, in some cases, the collection channel 104 also includes a MEMS-FPI.

As shown in FIG. 1 a non-transitory computer-readable medium 106 (e.g., memory and registers) and a microcontroller or other processor 108 are coupled to the module 100. The non-transitory computer-readable medium 106 and microcontroller 108 can be mounted, for example, on the same printed circuit board (PCB) as the module 100. In some instances, the microcontroller is implemented as an ASIC in the module. The computer-readable medium 106 can include read-only memory (ROM) 106A that stores computer-readable instructions to control operation of the light source 103 and sensor 110, as well as random access memory (RAM) 106B and various registers 106C to store calibration or other parameters. The microcontroller 108 is operable to receive and process output signals from the sensor 110 and to determine the reflectivity of the sample 112 at various wavelengths. For example, the microcontroller 108 is operable to determine the reflectivity of a Lambertian or other sample 112 under test as a function of wavelength.

As indicated above, manufacturing processes typically result in variations in fabrication, tolerances, and variability of the components of the module. Thus, to ensure proper and accurate measurements, it can be important to calibrate the module prior to using it to measure the reflectivity of unknown samples. The following paragraphs describe a calibration technique that can be used for spectrometer modules such as the module 100. The calibration can be performed, for example, by the manufacturer of the modules, the end-user of the module(s) or some other entity.

In general, aspects of the calibration method include calibrating the wavelength-versus-voltage as the voltage applied to the filter (e.g., the MEMS based-FPI) is varied, calibrating dark current (i.e., optical noise) and optical crosstalk, and calibrating the full system response against a known reflectivity standard. The calibrated values can be applied to measured spectra for a material under test (MUT) such as the sample 112.

Figure 2:
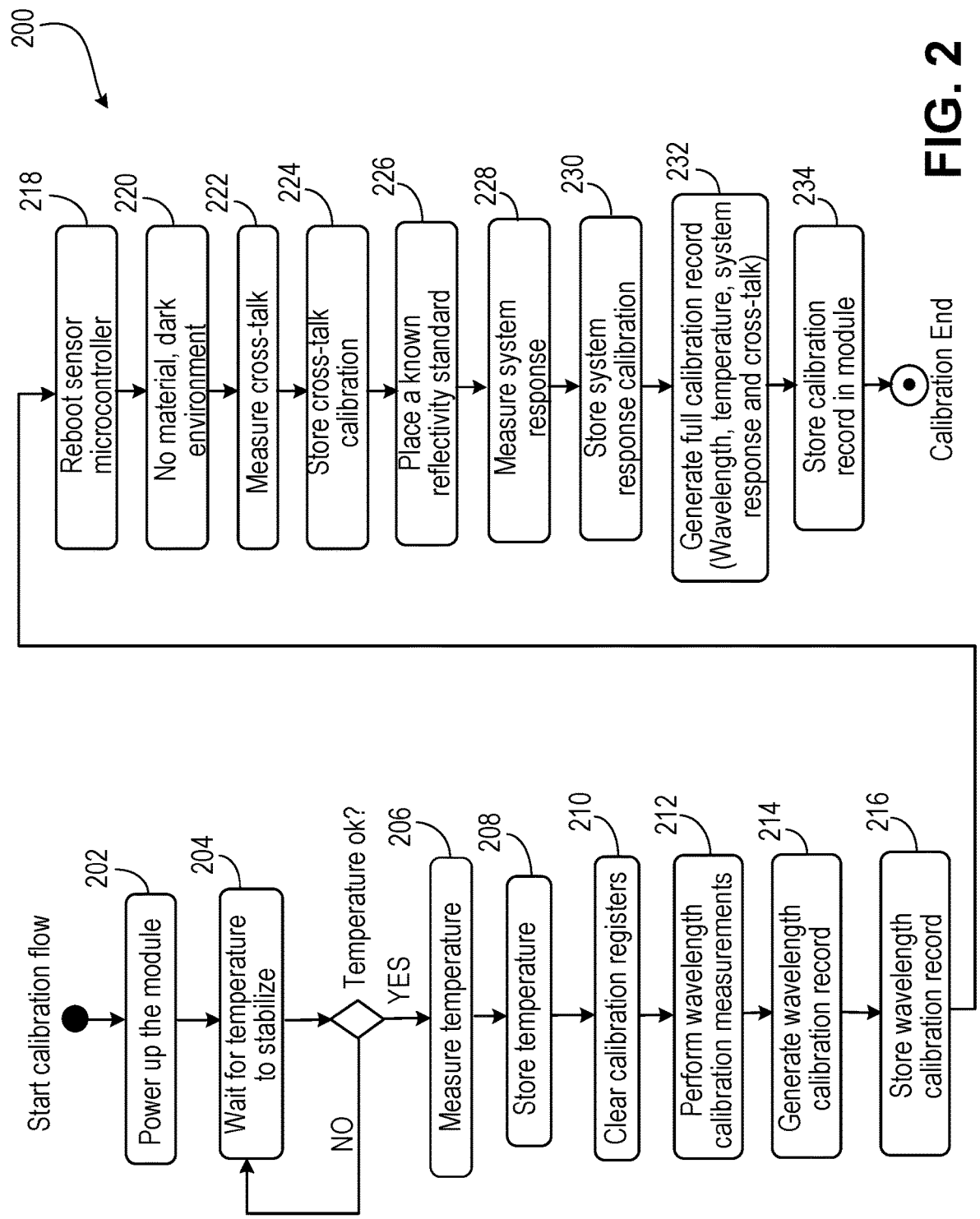
FIG. 2 is a flow chart illustrating an example of calibrating a spectrometer module.

As illustrated in FIG. 2, the calibration process 200 can be initiated by powering up the module 100 (202) and waiting until the temperature of the module becomes stabilized (204). Once the temperature of the module is stabilized, the module's temperature is measured (206) using, for example, a temperature sensor disposed in the module 100. The measured temperature then can be stored in memory 106B (208).

Figure 3:
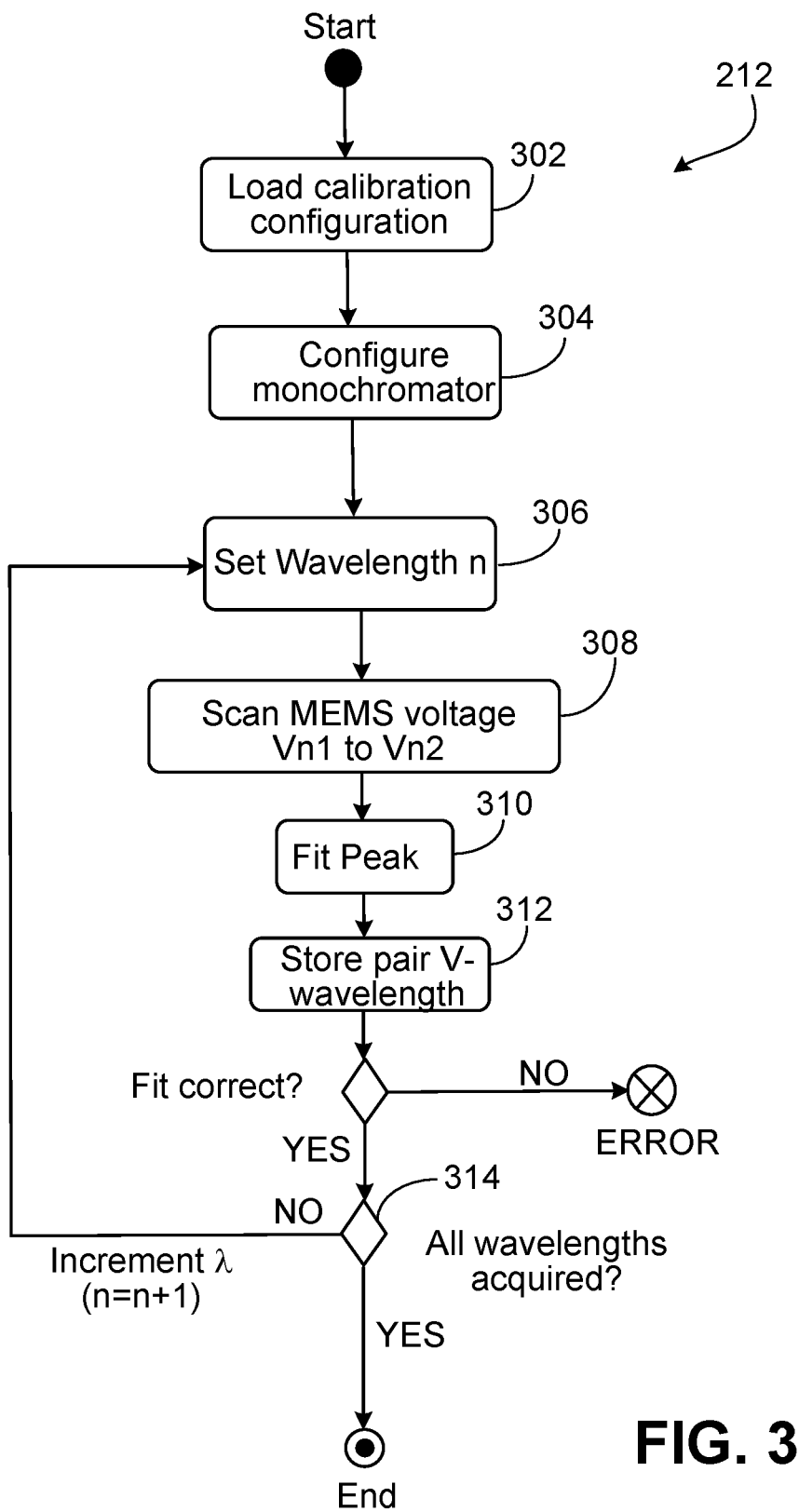
FIG. 3 is a flow chart illustrating an example of voltage-wavelength calibration.

In accordance with the process 200, calibration registers are cleared 106C (210), and the process continues by performing voltage-wavelength calibration (212) for the module 100. FIG. 3 illustrates various details of the voltage-wavelength calibration 212 according to some implementations. As indicated by 302, the voltage-wavelength calibration begins by loading calibration configuration parameters and values into appropriate registers 106C. The process also configures an external light source used for calibration and/or testing. The external light source can be part of the calibration and test equipment, and should cover the wavelength range of the sensor 110. Thus, various types of light sources can be used as the external light source for the calibration and testing. Configuring the external light source can include, for example, setting the light source to operate at a particular wavelength (or narrow wavelength band) (306). For example, the external light source may be configured initially to emit a narrow (e.g., 3 nm) band centered about 1350 nm. The voltage across the optical filter (e.g., the MEMS-based FPI) then is scanned from a low voltage value (Vn1) to a high voltage value (Vn2), or vice-versa (308). The microcontroller 108 identifies the peak output value detected by the sensor 110 (310) and stores the wavelength and corresponding voltage associated with the peak value in appropriate registers 106C (312). Assuming that no operational or other anomalies are detected, the process 212 proceeds to check whether data for all specified wavelengths (or narrow wavelength bands) within a specified range have been acquired (314). If data for all wavelengths (or narrow wavelength bands) has been acquired, then the voltage-wavelength calibration 212 ends. Otherwise, the process proceeds to set the wavelength of the external light source to the next wavelength in the range of interest, for example, by incrementing the wavelength by a predetermined amount (e.g., by 10 nm). This iterative process cycles repeatedly through blocks 306-314 until data for all wavelengths (or narrow wavelength bands) within the specified range have been acquired. In this manner, the voltage applied to the MEMS-based FPI is calibrated to yield linear scan spacing in the wavelength domain.

When the voltage-wavelength calibration process 212 of FIG. 3 concludes, the process 200 of FIG. 2 proceeds to generate a record of the calibrated voltage-wavelength values in a format suitable for use with the particular microcontroller 108 being used (214). For example, the calibrated voltage-wavelength record can be transformed into a format recognized by the microcontroller or other processor 108. The transformed voltage-wavelength record then can be stored in appropriate registers 106C (216), and the microcontroller or other processor 108 can be rebooted (218) to ensure that the calibrated voltage-wavelength record in loaded properly.

The process 200 of FIG. 2 then proceeds to perform optical crosstalk and dark noise calibration. Typically, when light is produced by the light source 103 and emitted from the module 100, not all the produced light traverses and reaches the sample 112 under test. Instead, a fraction of the light may be reflected by one or both sides of the cover glass 122 and may be detected by the photodiode or other sensor 110. Similarly, light passing through the wall separating the transmission and collection channels 102, 104 may be detected by the sensor 110, or the sensor 110 may detect spurious reflections. Such signals represent optical crosstalk ($S_{xtalk}(\lambda)$), which typically is wavelength-dependent. To calibrate the optical crosstalk, the module 100 is operated in the absence of a sample 112 in the light path (220). For example, the light emitted from the module can be directed to a very distant dark or substantially non-reflecting target. Signals ($S_{infinite\ measured}(\lambda)$ detected by the sensor 110 under such conditions can be considered to be the sum of the following two components: (i) the optical crosstalk ($S_{xtalk}(\lambda)$), and (ii) dark noise ($S_{dark}$). The dark noise ($S_{dark}$) represents dark current produced, for example, in the sensor 110 after the trans-impedance or other type of amplifier and offset compensation circuit. The dark noise ($S_{dark}$), which typically is present at all wavelengths of the scan and is substantially constant, can be determined by turning off the light source 103 and measuring the intensity measured by the sensor 110. The optical crosstalk calibration measurements then can be performed (222). As described in greater detail below, measurements for dark noise and optical crosstalk calibration at a given wavelength ($\lambda$) can be performed at the same time and as part of the same sequence of operations.

To calibrate the optical crosstalk, default calibration configuration values for the crosstalk can be loaded into the appropriate registers 106C. The module 100 then is operated in the absence of a sample or other material in the light path and is sequenced through the various specified wavelengths (or narrow wavelength bands) within the specified range of interest (e.g., 1350 nm-1650 nm in 10 nm steps). This can be accomplished, for example, by varying the voltage across the MEMS-based FPI so that the module 100 is configured to emit light having one wavelength (or narrow wavelength band) at a time. Alternatively, a MEMS-based FPI in the collection channel 104 can collect the light of various wavelengths produced by a broadband light source in the transmission channel. In either case, as a measurement is made for each wavelength ($\lambda$), the optical intensity measured by the sensor 110 value corresponds to ($S_{infinite\ measured}(\lambda)$, which includes the wavelength-dependent optical crosstalk ($S_{xtalk}(\lambda)$) as well as the dark noise ($S_{dark}$). The values ($S_{infinite\ measured}(\lambda)$, which represent the calibrated crosstalk and dark noise configuration values, can be stored in the appropriate registers 106C (224). In some instances, the values for the crosstalk ($S_{xtalk}(\lambda)$) and/or dark noise ($S_{dark}$) also are stored in registers 106C.

The process 200 of FIG. 2 then proceeds to calibrate the full system response against a known reflectivity standard (e.g., 99% reflectivity) using the previously obtained voltage-wavelength calibration data (i.e., the data stored at 216). Here too, default calibration configuration values for the system response can be loaded into the appropriate registers 106C. A reference material having known reflectivity ($R_{reference}(\lambda)$) is placed at a specified location, outside the module (e.g., on the cover glass), in the path of light emitted by the module 100 so as to reflect at least some of the light back toward the sensor 110 (226). Examples of the reference material include a material satisfying a Spectralon® or Permaflect® diffuse reflectance standard. The system response then is measured (228) by sequencing through the various specified wavelengths (or narrow wavelength bands) within the specified range of interest (e.g., 1350 nm-1650 nm in one nm steps). This can be accomplished, for example, by varying the voltage across the MEMS-based FPI so that the module 100 is configured to emit light having one wavelength (or narrow wavelength band) at a time. Alternatively, as mentioned above, the transmission channel 102 can include a broadband source, with the MEMS-based FPI in the collection channel 104. In either case, the optical intensity measured by the sensor 110 for a given wavelength ($\lambda$) can be designated as $S_{reference\ measured}(\lambda)$, which represents the calibrated system response value at the particular wavelength. These values can be stored in appropriate registers 106C (230).

The process 200 then generates a full calibration record in a format suitable for use with the particular microcontroller 108 being used (232). For example, the calibrated wavelength values, crosstalk values and system response values can be transformed into a format recognized by the microcontroller or other processor 108. The transformed record then can be stored in appropriate registers 106C (234), which completes the calibration process 200.

The stored calibration values then can be used to obtain calibrated wavelength-dependent reflectivity values $R_{MUT}(\lambda)$ of a sample 112. In particular, the following equation can be used to calculate the calibrated wavelength-dependent reflectivity values $R_{MUT}(\lambda)$:

$$R_{MUT}(\lambda) = R_{reference}(\lambda) \cdot \frac{S_{MUTmeasured}(\lambda) - S_{infinitemeasured}(\lambda)}{S_{referencemeasured}(\lambda) - S_{infinitemeasured}(\lambda)}, \quad \text{(Eq. 1)}$$

where $R_{reference}(\lambda)$ is the known wavelength-dependent reflectivity of the reference material, $S_{infinite\ measured}(\lambda)$ is the calibrated wavelength-dependent intensity value indicative of the optical crosstalk intensity and dark noise, $S_{reference\ measured}(\lambda)$ is the calibrated wavelength-dependent system response intensity value, and $S_{MUT\ measured}(\lambda)$ is an intensity value measured by the sensor when a sample to-be-tested 112 is placed in the module's light path.

Figure 4:
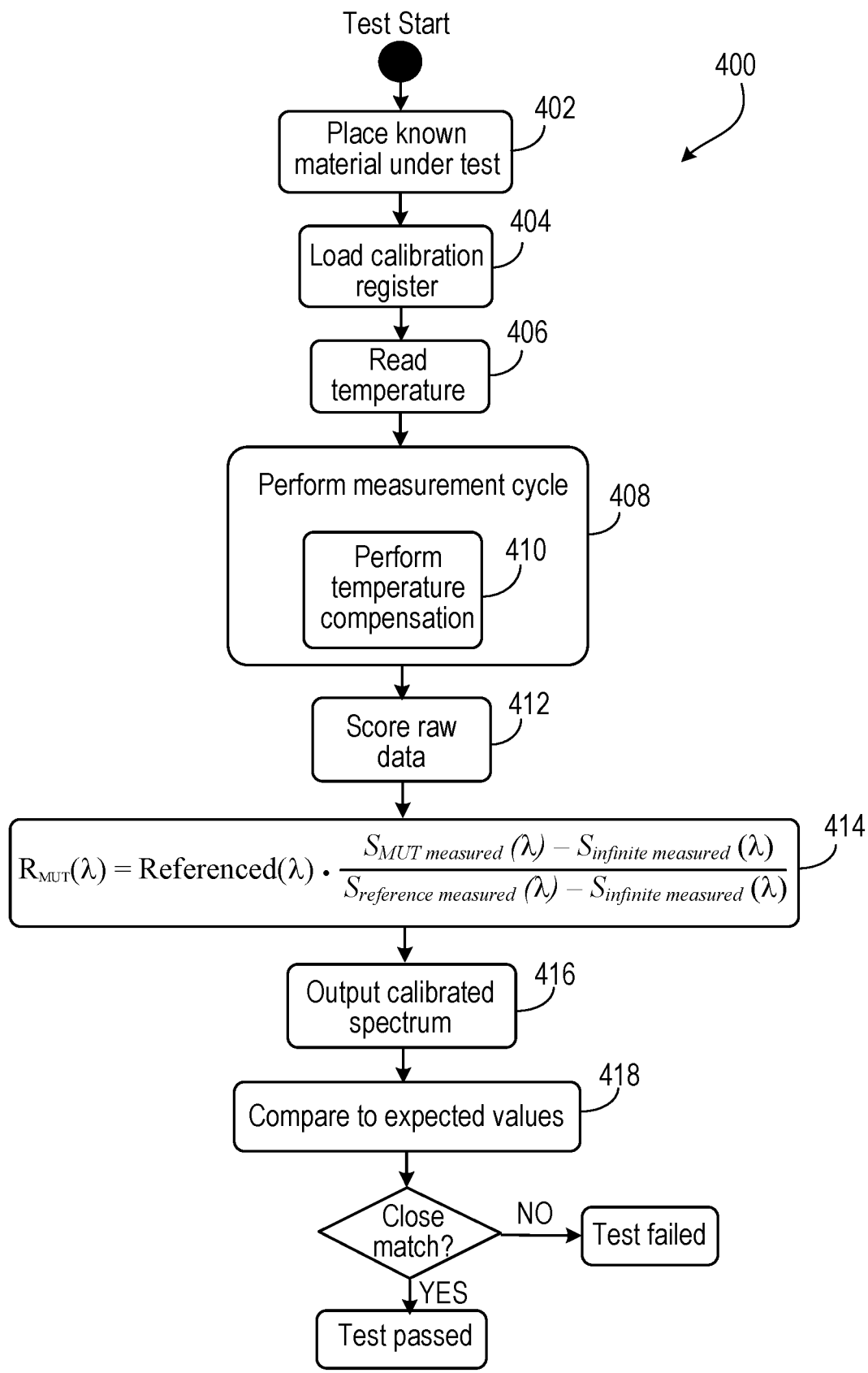
FIG. 4 is a flow chart illustrating an example of using a calibrated spectrometer module to test a known sample.

The calibrated module 100 can be tested using a sample of known material (i.e., a test target) to ensure that the components of the system are operating correctly. FIG. 4 illustrates an example of the test process 400. As indicated by 402, a sample of known material is placed in the test position. Preferably, the sample is placed at the same distance 114 from the module as was the previously tested reference material. If not, the microcontroller 108 should be configured to account for this difference through proper scaling. The process included loading the previously stored calibration data (i.e., $R_{reference}(\lambda)$, $S_{infinite\ measured}(\lambda)$, $S_{reference\ measured}(\lambda)$) into the appropriate registers 106C (404). As indicated by 406, the temperature is measured. This temperature value can be compared to the temperature value stored at 208 and, if needed, can be used to compensate for temperature drift (see 410).

Next, the process 400 performs a measurement cycle (408) in which the module 100 is sequenced through the various specified wavelengths (or narrow wavelength bands) within the specified range of interest (e.g., 1350 nm-1650 nm in one nm steps). This can be accomplished, for example, by varying the voltage across the MEMS-based FPI so that the module 100 is configured to emit light having one wavelength (or narrow wavelength band) at a time. Alternatively, as mentioned above, the transmission channel 102 can include a broadband source, with the MEMS-based FPI in the collection channel 104. In either case, as a measurement is made for each wavelength (λ), the optical intensity values measured by the sensor 110 correspond to $S_{MUT\ measured}(\lambda)$. The measured values ($S_{MUT\ measured}(\lambda)$) can be stored, for example, in the memory 106B (412). At 414, the microcontroller 108 calculates the calibrated wavelength-dependent reflectivity values ($R_{MUT}(\lambda)$) based on equation (1) above. The microcontroller 108 then provides the calculated values ($R_{MUT}(\lambda)$) as output (416). The output can be compared to expected values (418) and, if there is a sufficiently close match, it is assumed that the system components are operating properly. The tested module 100 then can be used to test optical properties (e.g., reflectivity) of unknown samples 112.

Figure 5:
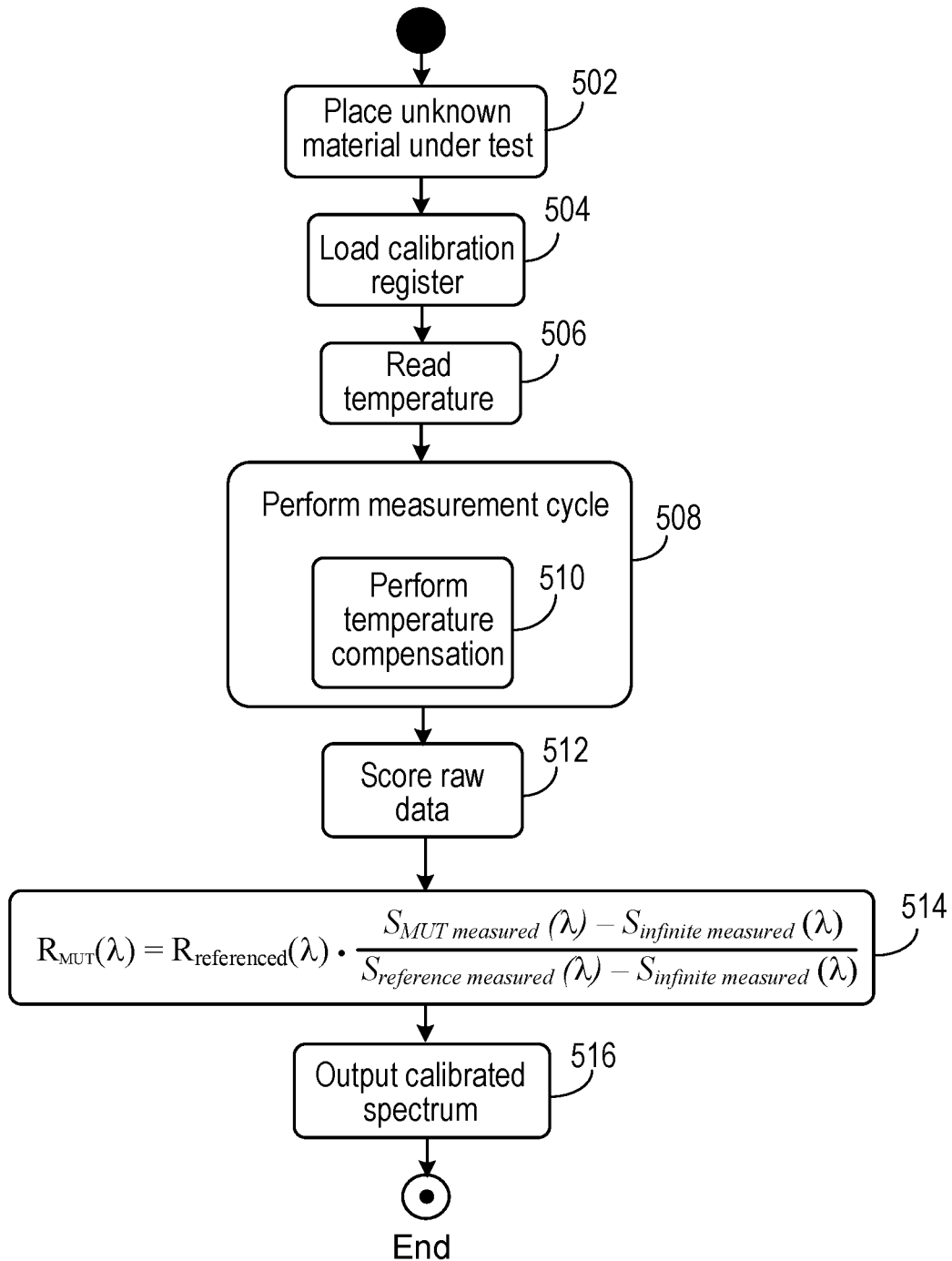
FIG. 5 is a flow chart illustrating an example of using a calibrated spectrometer module to test an unknown sample.

A process similar to that of FIG. 4 can be implemented when using the calibrated, tested module 100 to determine the optical properties (e.g., reflectivity) of an unknown sample 112. As indicated in FIG. 5, the process 500 includes placing a sample 112 of unknown material in the test position (502). Preferably, the sample is be placed at the same distance 114 from the module as was the previously tested reference material. If not, the microcontroller 108 should be configured to account for this difference (e.g., through scaling). The process 500 includes loading the previously stored calibration data (i.e., $R_{reference}(\lambda)$, $S_{infinite\ measured}(\lambda)$, $S_{reference\ measured}(\lambda)$) into the appropriate registers 106C (504). As indicated by 506, the temperature is measured. This temperature value can be compared to the temperature value stored at 208 and, if needed, can be used for temperature compensation (see 510).

Next, the process 500 performs a measurement cycle (508) in which the module 100 is sequenced through the various specified wavelengths (or narrow wavelength bands) within the specified range of interest (e.g., 1350 nm-1650 nm in one nm steps). This can be accomplished, for example, by varying the voltage across the MEMS-based FPI so that the module 100 is configured to emit light having one wavelength (or narrow wavelength band) at a time. Alternatively, as mentioned above, the transmission channel 102 can include a broadband source, with the MEMS-based FPI in the collection channel 104. In either case, as a measurement is made for each wavelength (λ), the optical intensity values measured by the sensor 110 correspond to $S_{MUT\ measured}(\lambda)$. The measured values ($S_{MUT\ measured}(\lambda)$) can be stored, for example, in the memory 106B (512). At 514, the microcontroller 108 calculates the calibrated wavelength-dependent reflectivity values ($R_{MUT}(\lambda)$) based on equation (1) above. The microcontroller 108 then provides the calculated values ($R_{MUT}(\lambda)$) as output (516). In some implementations, the calculated values ($R_{MUT}(\lambda)$) are provided to a display screen coupled to the microcontroller 108.

Although the specific example described in the foregoing implementations uses the operation voltage of a MEMS tunable filter as the operating parameter for wavelength calibration, some implementations can use a different operating parameter for the wavelength calibration. For example, the operating parameter, in some instances, can be a different physical control mechanism (e.g., current, temperature or pressure). In some cases, the parameter of interest is the address of a pixel in an array detector.

Thus, more generally, the method of calibrating a spectrometer module can include performing measurements using the spectrometer module to generate wavelength-versus-operating parameter calibration data for the spectrometer module, performing measurements using the spectrometer module to generate optical crosstalk and dark noise calibration data for the spectrometer module, and performing measurements using the spectrometer module to generate full system response calibration data, against a known reflectivity standard, for the spectrometer module. The method further can include storing in memory, coupled to the spectrometer module, a calibration record that incorporates the wavelength-versus-operating parameter calibration data, the optical crosstalk and dark noise calibration data, and the full system response calibration data.

Various aspects of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded, for example, on a non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus" and "computer" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Various modifications may be made to the foregoing implementations, and features described above in different implementations may be combined in the same implementation. Further, unless expressly stated or implicitly required, the various operations may be performed in a different order than set forth in the foregoing examples. Some implementations may omit some operations and/or may include additional operations. Thus, other implementations are within the scope of the claims.

What is claimed is:

1. A method of calibrating a spectrometer module, the method comprising:
    performing measurements using the spectrometer module to generate wavelength-versus-operating parameter calibration data for the spectrometer module;
    performing measurements using the spectrometer module to generate optical crosstalk and dark noise calibration data for the spectrometer module, wherein performing measurements to generate optical crosstalk and dark noise calibration data includes operating the spectrometer module in the absence of a sample being present in a path of light emitted by the spectrometer module, or while light emitted by the spectrometer module propagates toward a distant dark target;
    performing measurements using the spectrometer module to generate full system response calibration data, against a known reflectivity standard, for the spectrometer module; and
    storing in memory, coupled to the spectrometer module, a calibration record that incorporates the wavelength-versus-operating parameter calibration data, the optical crosstalk and dark noise calibration data, and the full system response calibration data.

2. The method of claim 1 further including:
    applying the calibration record to measurements by the spectrometer module.

3. The method of claim 1 further including:
    applying the calibration record to measurements of a sample by the spectrometer module to obtain one or more calibrated wavelength-dependent reflectivity values ($R_{MUT}(\lambda)$).

4. The method of claim 3 wherein the one or more calibrated wavelength-dependent reflectivity values ($R_{MUT}(\lambda)$) are calculated in accordance with:

$$R_{MUT}(\lambda) = R_{reference}(\lambda) \cdot \frac{S_{MUTmeasured}(\lambda) - S_{infinitemeasured}(\lambda)}{S_{referencemeasured}(\lambda) - S_{infinitemeasured}(\lambda)},$$

where $R_{reference}(\lambda)$ is a wavelength-dependent reflectivity of a known reference material, $S_{infinite\ measured}(\lambda)$ is a calibrated wavelength-dependent intensity value indicative of optical crosstalk intensity and dark noise, $S_{reference\ measured}(\lambda)$ is a calibrated wavelength-dependent system response intensity value, and $S_{MUT\ measured}(\lambda)$ is an intensity value measured by the spectrometer module in response to a sample being tested.

5. The method of claim 1 including generating calibration data for the optical crosstalk at a particular wavelength and generating calibration data for the dark noise at the particular wavelength at the same time as part of a same sequence of operations.

6. The method of claim 1 wherein performing measurements using the spectrometer module to generate optical cross-talk and dark noise calibration data for the spectrometer module includes:
    causing the spectrometer module to be operable to detect or filter specified wavelengths or wavelength bands of light produced by a broadband source; and
    measuring a response by the spectrometer module for each of the specified wavelengths or wavelength bands, wherein the response by the spectrometer module is obtained in the absence of a sample being present in the path of light emitted by the spectrometer module, or while light emitted by the spectrometer module propagates toward the distant dark target.

7. The method of claim 1 wherein performing measurements using the spectrometer module to generate optical cross-talk and dark noise calibration data for the spectrometer module includes:
    causing the spectrometer module to emit, one after another, a sequence of specified wavelengths or wavelength bands within a specified range of wavelengths; and
    measuring a response by the spectrometer module for each of the specified wavelengths or wavelength bands, wherein the response by the spectrometer module is obtained in the absence of a sample being present in the path of light emitted by the spectrometer module, or while light emitted by the spectrometer module propagates toward the distant dark target.

8. The method of claim 1 wherein performing measurements using the spectrometer module to generate full system response calibration data, against a known reflectivity standard, includes placing a reference material having known reflectivity at a specified location outside the spectrometer module in a path of light emitted by the spectrometer module so as to reflect at least some of the emitted light back toward the spectrometer module.

9. The method of claim 8 including:
causing the spectrometer module to receive a sequence of specified wavelengths, or wavelength bands, while the reference material having known reflectivity is at the specified location.

10. The method of claim 1 including transforming the calibration record into a format recognized by a microcontroller or other processor coupled to the spectrometer module.

11. The method of claim 1 wherein the spectrometer module includes a voltage-controlled filter operable to control which one or more wavelengths of light are emitted from, or detected by, the spectrometer module, the method including:
calibrating voltage values applied to the voltage-controlled filter to yield a linear scan spacing in a wavelength domain.

12. The method of claim 1 including:
applying the calibration record to measurements by the spectrometer module of a test target of known reflectivity to obtain one or more calibrated wavelength-dependent reflectivity values;
comparing the reflectivity values for the test target to expected values; and
determining whether the spectrometer module is operating properly based on a result of the comparing.

13. The method of claim 12 further including:
applying the calibration record to measurements by the spectrometer module of a sample having unknown reflectivity,
wherein determining whether the spectrometer module is operating properly based on a result of the comparing is performed before applying the calibration record to measurements by the spectrometer module of a sample having unknown reflectivity.

14. The method of claim 1 further including:
applying the calibration record to measurements of a sample under test by the spectrometer module to obtain one or more calibrated wavelength-dependent reflectivity values, wherein the one or more calibrated wavelength-dependent reflectivity values are calculated based on a wavelength-dependent reflectivity of a known reference material, a calibrated wavelength-dependent intensity value indicative of optical crosstalk intensity and dark noise, a calibrated wavelength-dependent intensity value for a system response of the spectrometer module, and an intensity value measured by the spectrometer module in response to the sample under test.

15. The method of claim 1 wherein the wavelength-versus-operating parameter calibration data is wavelength-versus-voltage calibration data.

16. A non-transitory storage medium storing computer instructions operable to cause one or more computers to perform operations comprising:
applying a calibration record to measurements of a sample by a spectrometer module to obtain one or more calibrated wavelength-dependent reflectivity values ($R_{MUT}(\lambda)$), wherein the one or more calibrated wavelength-dependent reflectivity values ($R_{MUT}(\lambda)$) are calculated based on a wavelength-dependent reflectivity of a known reference material, a calibrated wavelength-dependent intensity value indicative of optical crosstalk intensity and dark noise, a calibrated wavelength-dependent intensity value for a system response of the spectrometer module, and an intensity value measured by the spectrometer module in response to a sample being tested, and
wherein the calibrated wavelength-dependent intensity value indicative of optical crosstalk intensity and dark noise is calculated based on operation of the spectrometer module in the absence of a sample in a light path of the spectrometer module, or while light emitted by the spectrometer module propagates toward a distant dark target.

17. The non-transitory storage medium of claim 16 wherein the one or more calibrated wavelength-dependent reflectivity values ($R_{MUT}(\lambda)$) are calculated in accordance with:

$$R_{MUT}(\lambda) = R_{reference}(\lambda) \cdot \frac{S_{MUT\,measured}(\lambda) - S_{infinite\,measured}(\lambda)}{S_{reference\,measured}(\lambda) - S_{infinite\,measured}(\lambda)},$$

where $R_{reference}(\lambda)$ is the wavelength-dependent reflectivity of a known reference material, $S_{infinite\,measured}(\lambda)$ is the calibrated wavelength-dependent intensity value indicative of optical crosstalk intensity and dark noise, $S_{reference\,measured}(\lambda)$ is the calibrated wavelength-dependent intensity value for a system response of the spectrometer module, and $S_{MUT\,measured}(\lambda)$ is the intensity value measured by the spectrometer module in response to the sample being tested.

* * * * *